United States Patent [19]

Hendriksen

[11] 4,267,896

[45] May 19, 1981

[54] METHOD AND APPARATUS FOR ALIGNING AUTOMOBILE SUSPENSION MEMBERS

[76] Inventor: Errol C. Hendriksen, 29200 45th Ave. South, Auburn, Wash. 98002

[21] Appl. No.: 118,556

[22] Filed: Feb. 4, 1980

[51] Int. Cl.³ ............................................. B60G 9/00
[52] U.S. Cl. .................................. 180/73 R; 180/88; 267/66; 280/725; 280/724
[58] Field of Search ............. 280/725, 724; 180/73 R, 180/73 TL, 71, 88; 267/66, 67

[56] References Cited

U.S. PATENT DOCUMENTS

| | | | |
|---|---|---|---|
| 2,856,201 | 10/1958 | Muller | 180/73 R |
| 3,095,242 | 6/1963 | Van Der Wilt | 180/88 |
| 3,193,303 | 7/1965 | Allison | 180/73 R |
| 3,231,040 | 1/1966 | Blanchette | 180/73 R |
| 3,294,415 | 12/1966 | Allison | 180/73 R |
| 3,649,042 | 3/1972 | Allison | 180/73 R |
| 3,695,605 | 10/1972 | Grossi | 267/66 |
| 3,764,158 | 10/1973 | Lukasik | 267/66 |
| 3,788,629 | 1/1974 | Johnson | 267/66 |
| 3,869,016 | 3/1975 | Astheimer | 180/73 R |

OTHER PUBLICATIONS

1971 Ford Motor Co. Shop Manual, pp. 14-31-01 to 14-31-03.

Primary Examiner—Robert R. Song
Attorney, Agent, or Firm—Christensen, O'Connor, Johnson & Kindness

[57] ABSTRACT

A method of aligning the rear suspension of an automobile is practiced in connection with an apparatus for adding linear adjustability to the pivotal connection between the lower control arms and the rear axle housing of an automobile. The linearly adjustable connection comprises a pair of cam plates adapted to be affixed to opposite sides of a rear axle housing bracket. The first end of the lower control arm is installed in the rear axle housing bracket intermediate the cam plates and a threaded pin is inserted through aligned elongate slots formed in the cam plates and housing bracket to hold the lower control arm in position with respect to the rear axle housing. The elongate dimension of the slots is oriented parallel to the fore/aft axis of the automobile. A pair of circular cams are eccentrically mounted on the threaded pin in such a manner that they move in unison with the pin. The cams abut the cam plates and are positioned between pairs of vertically oriented parallel flanges extending from one face of each cam plate. The eccentric mounting of the cams and their captivity between the flanges cause the pin to move linearly within the slots as the pin and cams are rotated. The linear movement of the pin causes a change in the spatial relation between the first end of the control arm and the axle housing. The control arm is attached at a second end thereof to the automobile frame and is inextensible. Therefore, the change in relation between the first end of the control arm and the axle housing translates directly into a change in relation between the axle housing and the frame thereby providing the capability of aligning the axle housing with respect to the automobile frame.

7 Claims, 2 Drawing Figures

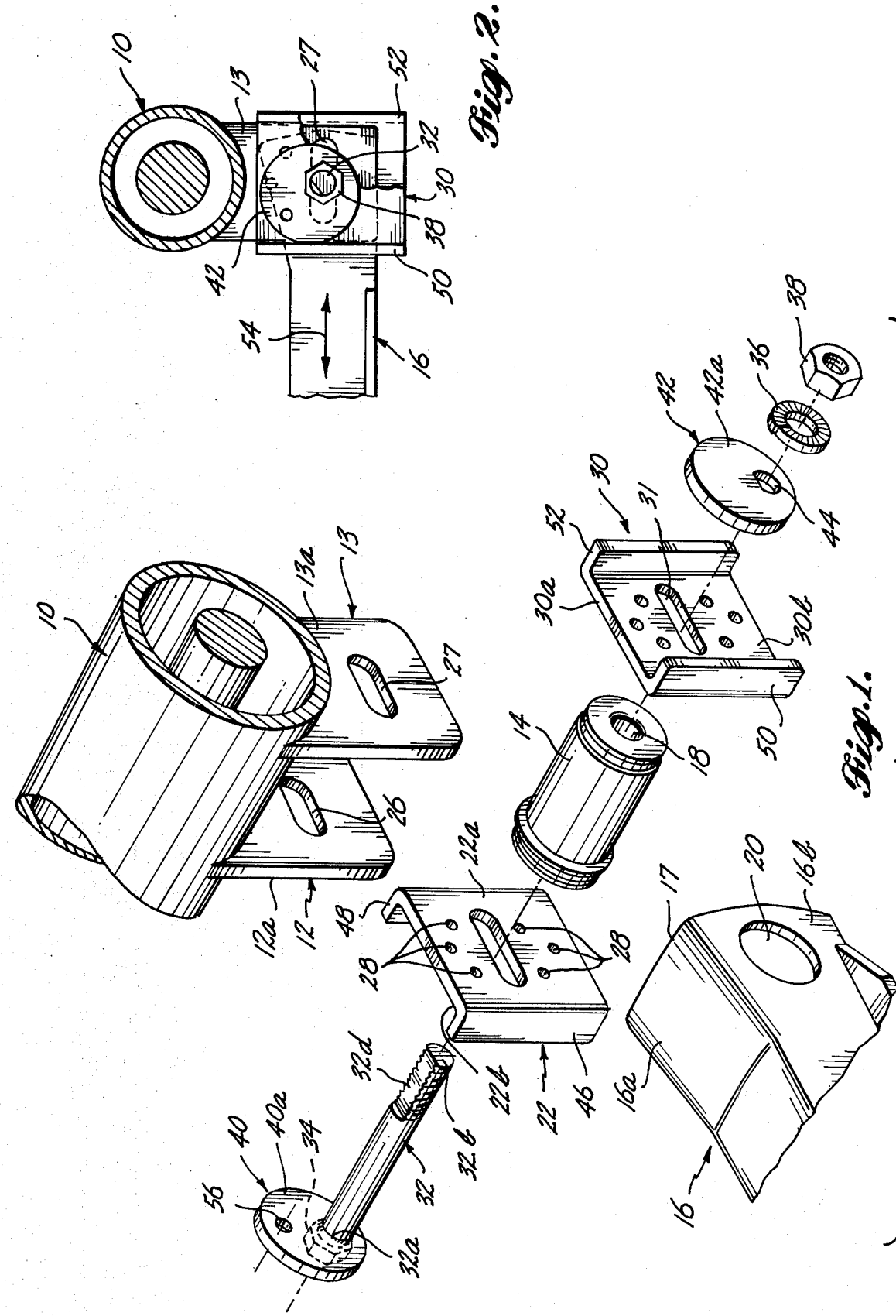

METHOD AND APPARATUS FOR ALIGNING AUTOMOBILE SUSPENSION MEMBERS

BACKGROUND OF THE INVENTION

The present invention relates to automobile suspensions and more particularly relates to a method and apparatus for aligning the rear axle of an automobile with respect to the frame.

A typical rear suspension system for automobiles currently in use includes two elongate lower control arms made of sheet metal stampings of box or channel cross section. The control arms have radial type rubber bushings installed at their ends. Each of the lower control arms is connected at a first end to a bracket on the automobile frame by means of a pin inserted through the rubber bushing and the bracket. The other end of each lower control arm is connected to a bracket on the lower side of the rear axle housing, one arm adjacent each rear wheel, also by means of a pin inserted through the bracket and bushing. Upper control arms of channel cross section, similar to but usually shorter than the lower control arms, also have radial bushings installed at their ends and are connected between the frame and the upper side of the rear axle by a pin and bracket arrangement similar to that used with the lower control arms. A coil spring is located near each of the rear wheels interposed between a seat on the frame and a pad on the top of the axle housing or on the top of the lower control arm.

The rear wheel suspensions constructed as described above have a number of shortcomings. For example, during manufacture the manufacturing tolerances in each of the rear suspension component parts can build up and result in displacement of the rear axle with respect to the frame thereby hindering proper rear wheel tracking. The mistracking of the rear wheels can cause steering instability resulting in poor driver control over the automobile. The improper tracking can also cause toe-in of the rear wheels, resulting in abnormally rapid tire wear.

At the present time, there is no easy method of correcting such misalignment of the rear wheels of the automobile. In order to correct the mistracking problem, it is sometimes necessary to take drastic structural modification steps, such as shortening the lower control arm. In the alternative, it may be possible to correct the tracking problem by replacing all of the bushings in the rear suspension system. The first alternative is time consuming and expensive and the second alternative is not always successful since it is possible to replace all of the bushings in the rear suspension and still have the tolerances build up so that the net result is a continuation of the rear axle alignment and mistracking problem. In fact, one major automobile manufacturer abandoned its use of coil spring rear suspension on passenger automobiles because it could not satisfactorily correct mistracking problems.

It is therefore an object of the present invention to provide a method and apparatus for aligning the rear suspension of an automobile.

It is a further object of this invention to provide such a method and apparatus that is relatively easy to install as a modification to existing equipment in order to transform a formerly unalignable rear axle housing into one which is readily adjustable.

It is another object of this invention to provide an apparatus for installation on the rear suspension of an automobile which allows the relationship of the lower control arm and the axle housing to be adjusted to thereby align the rear wheels.

It is a further object of this invention to provide such an adjustable connection that is structurally sound enough to withstand the torque and forces to which the rear suspension of an automobile is subjected during normal driving, but that is relatively inexpensive to construct and easy to install and maintain.

SUMMARY OF THE INVENTION

In accordance with the above-stated objects, the present invention provides an improvement in the rear suspension system of an automobile having a coil spring suspension of the type in which a lower control arm is connected between the rear axle housing and the frame of the automobile. The apparatus of the present invention provides a linearly adjustable pivot connection between one end of the lower control arm and the axle housing bracket. The improved adjustable connection includes a pair of cam plates adapted to be affixed to the axle housing bracket, each of the cam plates having a slot formed therein such that when the plates are affixed to the axle housing bracket, the slots are parallel to the fore/aft axis of the automobile. A circular cam is eccentrically mounted adjacent a first end of a pin such that the pin and cam rotate in unison. The pin passes through the slots in the cam plates and through the axle housing bracket. One face of the cam abuts a face of the cam plate and the cam is held captive between a pair of flanges extending orthogonally from the face of the cam plate. A second similar cam is likewise eccentrically mounted on the pin adjacent a second end of the pin and adjacent the second cam plate. The second cam is likewise held captive between flanges extending orthogonally from the second cam plate. The pin is threaded adjacent its second end and is held in place by a conventional nut threaded onto the second end of the pin.

The above-described pivot connection is linearly adjustable by rotation of the cams. The eccentric mounting of the cams transforms the rotating motion of the cams into a linear motion of the threaded pin within the slots in the cam plates. As the pin moves linearly in the slots, it moves the end of the lower control arm with it, thereby changing the spatial relation between the lower control arm and the rear axle. Since the lower control arm is attached at its other end to the frame with no possibility of linear movement available, the change in relation between the lower control arm and the rear axle housing provides a linear fore/aft movement of the rear axle housing with respect to the frame. Preferably, a similar linearly adjustable pivot connection is provided on the other lower control arm each such connection being independently linearly adjustable and thereby providing independent adjustment for each of the rear wheels and allowing the operator to align the wheels for proper tracking with relation to the frame.

BRIEF DESCRIPTION OF THE DRAWINGS

The above-mentioned objects and advantages of the present invention will be better understood by those skilled in the art and others upon reading the ensuing specification in conjunction with the accompanying drawings in which:

FIG. 1 is a perspective view of a motor vehicle suspension having a lower control arm attached to the rear axle using linearly adjustable connection means construction in accordance with the present invention;

FIG. 2 is a perspective view of a cam plate, cam and threaded pin made in accordance with the principles of the present invention.

DETAILED DESCRIPTION OF THE PREFERRED EMBODIMENT

Referring now to FIG. 1, a portion of a typical rear axle housing 10 is shown in somewhat schematic representation. A rear axle housing bracket is depicted as having parallel bracket plates 12 and 13 affixed to and extending downwardly from the axle housing 10. A lower control arm 16, a portion of which is shown in FIG. 1, is typically of box or channel construction having a web 16a, and first and second parallel legs extending orthogonally from the web. In the conventional configuration, a radial bushing 14 having an aperture 18 formed longitudinally therein would be installed within a first end 17 of the lower control arm 16. The aperture 18 formed in the radial bushing would be aligned with a circular aperture 20 formed in the first leg 16b of the lower control arm 16. A similar aperture is formed in the opposite second leg of the control arm (not pictured). Conventionally the control arm and bushing would be inserted between the bracket plates 12 and 13 of the rear axle housing bracket and a pin would be passed through the housing bracket plates, bushing and control arm to hold the control arm in pivotal attachment to the rear axle housing. The apparatus of the present invention provides a means by which the pivotal connection of the control arm 16 to the axle housing 10 can be linearly adjusted thereby enabling an operator to change the spatial relation of the end of the control arm to the axle housing thereby aligning the axle housing with respect to the frame.

In accordance with the principles of the present invention, a first cam plate 22 is adapted to be affixed to the housing bracket plate 12 with a first face 22a of the cam plate abutting a first face 12a of the bracket plate. With the first cam plate 22 in position on the housing bracket an elongate slot 24 formed in the cam plate 22 is aligned with a similar elongate slot 26 formed in the bracket plate 12. It is necessary to affix the cam plate to the bracket plate 12 with a sufficient strength bond to withstand the forces applied to the rear axle housing during operation of the automobile. A preferred method of attaching the cam plate to the bracket plate is by pinning the cam plate. A series of holes 28 is formed in the cam plate for use in the pinning operation. When the cam plate is in position on the bracket plate the operator can drill holes in the bracket plate corresponding to at least two of the holes 28 on the cam plate. Drive pins are then driven into the holes 28 and in the corresponding holes in the bracket plate 12 to form an interference fit. While only two pins are necessary to maintain the cam plate in a proper orientation with respect to the bracket plate a pattern of six holes is provided in the illustrated embodiment. The six holes are provided so that the cam plate is adaptable to various existing housing brackets and the six holes are positioned so that at least two of them will be usable on any given housing bracket, thereby making the cam plate a universally usable item. A similar second cam plate 30 is affixed to the bracket plate 13 in the same manner as the first cam plate 22 is affixed to the bracket plate 12. A first face 30a of the second cam plate abuts a first face 13a of the bracket plate. An elongate slot 27 formed in the bracket plate 13 is in alignment with the slot 26 in the bracket plate 12. When the second cam plate is in position on the bracket plate 13 the slot 27 aligns with a slot 31 formed in the second cam plate 30.

The radial bushing 14 is positioned in the first end 17 of the lower control arm 16 between the first and second legs. The lower control arm 16 and bushing 14 are slidably inserted between the bracket plates 12 and 13 as shown in FIG. 2. A pin 32 having a hexagonal head 34 affixed to a first end 32a thereof and being threaded adjacent a second end 32b thereof is inserted through the slots in the cam plates and bracket plates, the aperture in the radial bushing and the apertures formed in the legs of the lower control arm 16 to hold the lower control arm in position on the rear axle housing bracket. A lock washer 36 is positioned on the second end 32b of the pin adjacent the cam plate 30 and the pin is held in position by a nut 38 that threadably engages the second end of the pin. A first circular planar cam member 40 is eccentrically affixed to the pin 32 adjacent the head 34 so that the pin and first cam member move in unison, the plane of the cam member 40 being orthogonal to the longitudinal axis of the pin 32. A first face 40a of the cam member abuts a second face 22b of the cam plate 22. A second circular planar cam member 42 is mounted on the pin 32 near the second end 32b. A first face 42a of the second cam member abuts a second face 30b of the second cam plate 30. The second cam member and the pin 32 are cooperable so that the cam member will turn in unison with the pin 32. Preferably, the threaded portion of the pin 32 has a flat side 32d formed thereon and the second cam member 42 has a D-shaped hole 44 formed therein through which the pin 32 passes.

First and second flanges, 46 and 48 respectively, extend substantially orthogonally from the second face 22b of the cam plate 22 in parallel relation to one another. The flanges 46 and 48 are oriented vertically on either side of the slot 24, orthogonal to the elongate dimension of the slot. The first cam member 40 is captive between the flanges 46 and 48. Similarly flanges 50 and 52 respectively extend substantially orthogonally from the second face 30b of the second cam plate 30 in parallel relationship to one another and orthogonal to the elongate dimension of slot 31. The second cam member 42 is captive between flanges 50 and 52. The spacing between the flanges 46 and 48 and the flanges 50 and 52 is slightly greater than the diameter of the respective cam members 40 and 42 so that the cam members are free to turn between the flanges.

FIG. 2 shows the apparatus of the present invention in position mounting the end of the lower control arm 16 to the rear axle housing bracket. It will be apparent to one skilled in the art that the control arm 16 is pivotable about the pin 32 as is the case in a conventional mounting arrangement. However, in addition to the pivotal movement of the lower control arm, it is also linearly movable fore and aft in relation to the automobile as shown by the arrow 54. By rotating the pin 32, the cam members 40 and 42 are moved in unison with the pin. The eccentric mounting of the cam members 40,42 combined with their captivity between the flanges 46, 48 and 50, 52 of the cam plates causes the pin 32 to move linearly within the slots 24, 26, 27 and 31 as the pin and cam members rotate. As the pin 32 moves fore/aft in the slots, it carries with it the first end 17 of the lower control arm 16. Since the opposite end (not shown) of the lower control arm is attached to the frame of the automobile in a manner that allows no linear movement and since the control arm is not extendable, the movement of the pin 32 causes the spatial relation between the axle housing 10 and the lower control arm 16 to change. There is a certain amount of fore/aft give available in the position of the rear axle housing due to its suspension by means of coil springs, therefore by rotating the pin 32 and cam members 40 and 42, the rear axle housing can be moved fore and aft in relation to the frame of the automobile and can thereby be aligned. A similar mounting arrangement is placed on the other lower control arm associated with the other rear wheel of the automobile thereby providing independent linear adjustment of each end of the axle housing to insure proper alignment of the axle housing with respect to the frame.

As was mentioned earlier, the cam plates 22 and 30 must be solidly affixed to the rear axle housing bracket in order to maintain the structural integrity of the rear suspension. In the preferred method described herein, the cam plates are pinned to the brackets by means of drive pins. However, the cam plates could also be welded to the brackets. Welding is not as desirable as pinning since the welded cam plate would be much harder to remove from the axle housing bracket if that was ever desired. A hole 56 can be formed in the cam member 40 so that once the rear axle housing is properly aligned, a hole corresponding to the hole 52 can be drilled in the cam plate 22 and the cam member 40 can be fixed in position by a drive pin driven into the hole 52 and the corresponding hole in the cam plate, thereby preventing the cam member from any unwanted rotation during operation of the automobile. The pin could be easily removed for readjustment and realignment of the rear end, if necessary.

While the apparatus of the present invention has been illustrated and described in conjunction with the alignment and mounting of the lower control arms to the rear axle housing bracket of an automobile, it will be understood by those skilled in the art and others that a similar arrangement can be used to add linear adjustability to other pivotal attachment points in the suspension system of an automobile, for example, to the control arms of a McPherson strut-type front end suspension. The cam plate and eccentric cam and pin arrangement of the present invention are easily installed on any conventional automobile having a coil spring rear suspension with a minimal amount of modification. Typically, the rear axle housing bracket will have a circular hole formed therein rather than the elongate slots pictured in FIG. 1. It will be necessary when installing the cam plates to the rear axle housing bracket to modify the hole existing in the rear axle housing bracket into an elongate slot of the same dimension as the slot in the cam plates.

It has been found that a slot of approximately two inches in length is sufficient to take care of most rear end misalignment problems. Since a mounting apparatus of the type provided by the present invention is installed on each of the rear wheels, making each of the rear wheels independently adjustable, a two-inch slot on each wheel will provide a maximum four-inch adjustment between the ends of the axle housing. Very seldom, if ever, will a rear end misalignment greater than that be experienced.

In summary therefore, an apparatus for adding linear adjustability to the pivotal connection of the lower control arms to the rear axle housing of an automobile is provided. By the addition of linear adjustability, it is possible to align the angle of the rear axle housing with respect to the automobile frame to correct mistracking and toe-in problems in the rear wheels. The apparatus comprises a pair of cam plates affixed to opposite sides of a rear axle housing bracket. The lower control arm is installed in the rear axle housing bracket intermediate the cam plates and a threaded pin is inserted to hold the lower control arm in position with respect to the axle housing bracket. A pair of circular cams are eccentrically mounted on the threaded pin such that they move in unison with the threaded pin, the eccentrically mounted cams abutting the cam plates and being positioned between flanges extending orthogonally from the face of the cam plates. A rotation of the threaded pin and cam member causes the pin to move linearly with the elongate slot formed in the cam plates and housing bracket, thereby causing the end of the lower control arm to also move with respect to the rear axle housing. Since the rear axle housing is spring-mounted and has some freedom of fore/aft movement and the lower control arm is attached to the frame with no provision for linear adjustment, the rear axle housing is the member which moves and changes position with respect to the lower control arm. It is therefore possible to align the angle of the rear axle housing with respect to the frame by changing the relation between the rear axle housing and the rear end of the lower control arms.

While a preferred embodiment of the present invention has been described and illustrated, it will be apparent to those skilled in the art and others that several changes can be made in the illustrated embodiment while remaining within the scope of the invention as defined in the following claims.

The embodiments of the invention in which an exclusive property or privilege is claimed are as follows:

1. In a suspension system for an automobile having a frame member and a rear axle housing, said frame member being suspended on said rear axle housing by a coil spring and having at least one lower control arm interposed between said frame member and said rear axle housing, a first end of said lower control arm being pivotally attached to said rear axle housing and a second end of said lower control arm being pivotally attached to said frame member, the improvement comprising a linearly adjustable connection for attaching said lower control arm to said rear axle housing, said improved linearly adjustable connection comprising:

a cam plate affixed to said rear axle housing, said cam plate lying in a substantially vertical plane substantially orthogonal to said rear axle housing and having an elongate slot formed therein, the elongate dimension of said slot being substantially parallel to the fore/aft axis of said automobile, said cam plate further including a pair of elongate flanges extending orthogonally from a first surface of said cam plate in substantially parallel spaced relation, the elongate dimension of said flanges being orthogonal to the elongate dimension of said slot, said slot being interposed between said flanges;

a mounting pin positioned within said slot and within a mounting hole formed in said first end of said lower control arm;

a circular planar cam member eccentrically mounted on said pin orthogonal to the elongate dimension of said pin, a first surface of said cam member abutting said first surface of said cam plate, said cam member being positioned between said flanges, said cam member being mounted on said pin in such a manner that the pin and cam member rotate in unison with one another, said cam member, pin and cam plate cooperating such that planar rotation of said cam member causes a linear movement of said pin within said slot to change the spatial relation between said first end of said lower control arm and said rear axle housing.

2. The improvement of claim 1 further including a second cam plate identical to said first cam plate affixed to said rear axle housing substantially parallel to said first cam plate, said first end of said control arm being positioned between said first and second cam plates, said mounting pin extending through a slot formed in said second cam plate, the flanges of said cam plate extending in a direction opposite the direction of extension of the flanges of said first cam plate.

3. The improvement of claim 2 further including a second cam member eccentrically mounted on said mounting pin for rotational movement in unison with said pin, the first surface of said second cam member abutting a first surface of said second cam plate, said second cam member being positioned between said flanges on said second cam plate.

4. The improvement of claim 2 wherein said rear axle housing includes an axle housing bracket, said cam plates being affixed to said axle housing bracket.

5. The improvement of claim 4 wherein said cam plates are affixed to said axle housing bracket by drive pins closely received by cooperating holes formed in said cam plates and said axle housing bracket.

6. In an automobile having a frame supported by coil springs on a rear axle housing, a lower control arm having first and second ends said lower control arm being pivotally attached at the first end thereof to a rear axle housing bracket affixed to said rear axle housing, said lower control arm being pivotally attached at the second end thereof to said frame, a method of adjusting in a horizontal plane, the angle between said rear axle housing and said frame of said automobile comprising the steps of:

(a) affixing a cam plate to said rear axle housing bracket, said cam plate lying in a substantially vertical plane and having an elongate slot formed therein, the elongate dimension of slot being substantially parallel to a fore/aft axis of said automobile, said cam plate further having a pair of elongate flanges extending substantially orthogonally therefrom in parallel spaced relation, the elongate dimension of said flanges being substantially orthogonal to the elongate dimension of said slot, said slot being interposed between said flanges;

(b) forming an elongate slot in said rear axle housing bracket in register with said slot in said cam plate;

(c) attaching said first end of said lower control arm to said axle housing bracket by passing a pin through said elongate slots in said cam plate and said rear axle housing bracket and through a hole formed in said first end of said lower control arm, said pin having an eccentrically mounted cam member affixed thereto substantially parallel to said cam plate, said cam member being positioned intermediate said flanges;

(d) rotating said pin and said cam member about the longitudinal axis of said pin, the rotational movement of said cam member being translated into linear movement of said pin within said slots by the eccentricity of said cam mounting so that the spatial relation between said rear axle housing and said first end of said control arm changes as said cam member is rotated.

7. The method of claim 6 wherein said step of affixing includes forming at least two holes in said cam plate, forming at least two holes in said axle housing bracket in register with said holes in said cam plate and driving pins into said holes in said cam plate and said bracket.

* * * * *